United States Patent [19]

Elderbaum

[11] 3,879,509

[45] Apr. 22, 1975

[54] METHOD OF PRODUCING THIN CERAMIC SHEETS WITH MINIMAL DISTORTION

[76] Inventor: Gilbert James Elderbaum, 3 Pallenberg Dr., Clinton, Conn. 06413

[22] Filed: July 16, 1973

[21] Appl. No.: 379,799

Related U.S. Application Data

[63] Continuation-in-part of Ser. No. 178,007, Sept. 7, 1971, abandoned.

[52] U.S. Cl. ...................... 264/56; 264/61; 264/63; 264/66; 264/125; 264/332

[51] Int. Cl.. C04b 35/10; C04b 35/64; C04b 37/00

[58] Field of Search ..................... 264/60, 61; 65/33

[56] References Cited

UNITED STATES PATENTS

| | | | |
|---|---|---|---|
| 3,434,817 | 3/1969 | Hazdra et al. | 65/33 |
| 3,637,435 | 1/1972 | Schwyn et al. | 264/61 |

FOREIGN PATENTS OR APPLICATIONS

| | | | |
|---|---|---|---|
| 666,512 | 7/1963 | Canada | 264/61 |

OTHER PUBLICATIONS

Shanefield et al., "The Manufacture of Fine-Grained Alumina Substrates for Thin Films," The Engineer, April, 1971, p. 26–31.

*Primary Examiner*—Donald J. Arnold
*Assistant Examiner*—John Parrish
*Attorney, Agent, or Firm*—DeLio and Montgomery

[57] ABSTRACT

The disclosure describes a method of manufacturing thin, flat sheets, particularly technical ceramics, with minimal distortion in the thin sheets, and comprises the steps of providing a sheet of ceramic greenware suitably drying the sheet and then firing the sheet while providing yielding restraining forces at the edges thereof. The restraining forces are sufficient to prevent warping and wrinkling of the thin sheet during firing but not sufficient to prevent shrinkage movement of the sheet as the ceramic particles fuse.

15 Claims, 6 Drawing Figures

METHOD OF PRODUCING THIN CERAMIC SHEETS WITH MINIMAL DISTORTION

This application is a continuation-in-part of copending application Ser. No. 178,007, filed Sept. 7, 1971, now abandoned.

The invention relates to a method of producing a cured product of ceramic material in thin sheet form, and more particularly relates to such a method which minimizes any distortion or unevenness in the surface of the fired sheet.

Cured ceramic sheets, which are used in some forms are termed "substrates" for mounting an electrical circuit and circuit components thereon and provide a base for component elements such as resistance patterns. Additionally, ceramic sheets are used in the production of capacitors in which a capacitor plate(s) is deposited on the ceramic sheets.

Uncured ceramic or greenware sheets shrink during the firing or curing operation. The amount of shrinkage of the green dimensions is dependent upon the initial amount of binders and plasticizers in the greenware composition, and may be 35% or more.

As used herein, the term "greenware" refers to a sheet or tape of ceramic particles which are mixed with a binder and plasticizer and then cast or rolled to produce a greenware sheet of predetermined dimensions. Such sheets before firing are usually dried, with the temperature slightly above the water boiling point to drive off the moisture and thereafter raised to a temperature which will fuse the ceramic particles, and also drive off the binder and plasticizer therein. In some greenware a plasticizer may not be used, depending upon the plasticity of the binder material. As the greenware is fired and reaches a temperature generally in the range of 600°–800°F., the plasticizers and binders are driven off as gases. The ceramic particles begin to soften and diffuse into each other as the temperature reaches 2,000°F., and above depending on the ceramic used. As such diffusion commences, the greenware starts to shrink. As a result, the overall volume of the sheet decreases towards the sum of the volumes of the ceramic particles.

As the ceramic sheets become thinner, there is more of a tendency for waves and wrinkles to appear on the sheet, developing from the edges thereof, and general warpage of the sheet.

It is believed that the manner in which the waves and/or wrinkles and warpage appear in the sheet is due to initial shrinkage and/or uneven shrinkage on the edges. This waviness or wrinkles become more pronounced as the sheets become thinner, even the thicker sheets on the order of 0.060 in. exhibit some warpage. The sheets upon curing tend to develop a camber and most users of ceramic substrates include in their specifications a maximum camber in thousandths of an inch of dimension of the substrate which will be acceptable.

One technique that has been used in an attempt to minimize such warping is to place a weight of porous ceramic on the greenware sheet as it is fired. However, it takes almost twice as long to cure the greenware into ceramic with this method. This extended time delay is due to the fact that the ceramic carrier and the weight must be brought up to temperature before the surfaces of the greenware. Additionally, in many cases it is still necessary to grind the finished product to obtain a specified camber and surface finish.

The present invention allows the production of thin ceramic sheets and substrates in which the camber is substantially reduced and further in which wrinkling or waving of the edges of the sheet is eliminated. The present invention provides ceramic substrates which will meet rigid camber and surface finish specifications without the necessity of grinding.

Briefly stated, the invention in one form thereof comprises the steps of providing a sheet of ceramic greenware of the desired thickness and length and width dimensions, taking into account shrinkage, and firing the greenware while applying limited restraint to the edges thereof which will produce a tension effect in the sheet but which tension is insufficient to prevent the normal shrinkage of the greenware as the ceramic particles fuse. In one form of the invention the greenware sheet has applied thereto additional thicknesses of greenware defining a substantial border about the desired area of the finished sheet (considering the shrinkage from the green to the first state). Such increased thickness may be cast integral with the sheet or may be built up from steps or a border cut from additional greenware. In the latter process the additional strips are laminated to the sheet to provide intimate contact therewith so that upon firing the ceramic particles in the border defining strips will fuse with the adjacent particles in the sheet itself. After firing, the border defining portion is cut from the sheet leaving a smooth planar sheet with minimal distortion and camber.

An object of this invention is to provide a new and improved method of producing cured ceramic sheets having minimal distortion and camber therein.

Another object of this invention is to provide a new and improved method of making ceramic substrates.

A further object of this invention is to provide an economical method of providing ceramic sheets of minimum camber and surface distortion without the requirement for machining operations.

The features of the invention which are believed to be novel are particularly pointed out and definitely claimed in the claims appended to the specification. The invention however, both as to its mode of practice and organization, together with further objects and advantages thereof may best be appreciated by reference to the following detailed description taken in conjunction with the drawings wherein:

Figures 1, 2:
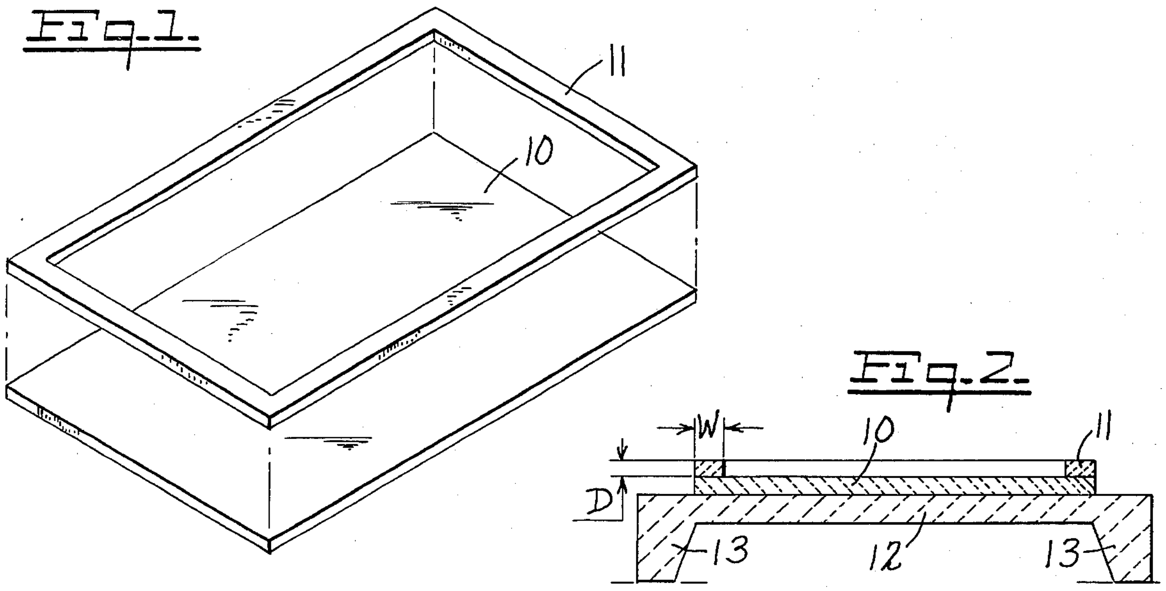
FIG. 1 is a view in perspective of a step in the practice of an embodiment of the invention.
FIG. 2 is an elevation in half section of a sheet of green ceramic ready for curing in accordance with the invention.

FIG. 1 exemplifies a first embodiment of practicing the invention. A sheet 10 of ceramic greenware is first provided. For purposes of illustration, the thickness of the greenware is shown exaggerated.

Sheets of ceramic greenware or tape, as it is sometimes called, are made from a mixture of ceramic particles, binder, solvent and a plasticizer, if required. This mixture is made into elongated sheet form, as by extruding, or casting on a non-adherent surface and doctor bladed to a desired dimension. After some drying of the solvent it may be readily lifted. Prepared greenware sheets or rolls thereof are commercially available. One source is Ceramic Systems, Inc. (formerly Dielectric Systems, Inc.) of San Diego, Calif.

An exemplary greenware sheet may be 94% aluminum and 6% aluminum silicate plus binder and plasticizer.

The sheet 10 may be cut from a larger section, preferably by die cutting. Then a second sheet of greenware is cut to define a border 11. Border 11 is placed on sheet 10 preferably with the outer edges thereof aligned. In most cases the border or portion of increased thickness has inner and outer edges defining rectangles and a uniform dimension therebetween. The dimensions of sheet 10 and border 11 are selected, in view of shrinkage to provide a finished sheet of predetermined dimension within the border. The amount of shrinkage will depend on the percentage of ceramic particles in the greenware.

As used herein the term "border" refers to the provision of an outline about the green area to be cured, which outline is of increased thickness with respect to the sheet, and the border need not be continuous.

The border 11 is then placed in intimate contact with the contacting surface of sheet 10 so that there is an inter diffusion of the ceramic particles of the border and sheet upon firing. This may be achieved by coating the contacting surface of the border with a solvent, for example, toluene. However, pressure consolidation is preferred. The border and sheet may be subjected to a pressure sufficient to cuase the surfaces to slightly interface. A pressure of 2,000 pounds/in.$^2$ applied for about one minute at slightly above room temperature is sufficient. A temperature of 100°F. is sufficient at the pressure stated above.

Figure 3:
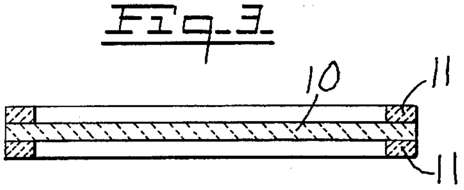
FIG. 3 is an elevation in half section of another sheet of green ceramic ready for curing in accordance with the invention.

Thereafter the sheet 10 and border 11 are placed on a piece of kiln furniture such as a furnace carrier 12 as shown in FIG. 2. Carriers 12 are of ceramic material and have a very smooth surface which has been ground and preferably lapped. Carriers 12 further include leg portions 13 to permit stacking thereof in the furnace. Border 11 may be applied to each side of a sheet 10, as shown in FIG. 3.

The sheets 10 with borders 11 are then heated to about 220°F. to dry out any moisture. The termperature is then raised to about 600°–800°F. or higher in two or three hours to drive off the binder, and thereafter raised to the final temperature in about 6 hours. In the case of the 94% aluminum, 6% alumina silicate composition previously mentioned the final temperature is approximately 2,760°F. When the final temperature is reached, it may be maintained for a half hour or more to equalize the temperature in the sheet. Thereafter, the sheet is allowed to cool and removed from the furnace.

Furnaces for the purpose described are commercially available and include temperature-time controls for predetermining selected times and temperatures as well as temperature rise with respect to time.

As the ceramic particles reach a temperature at which they begin to fuse, the sheet shrinks toward the summation of the volumes of the ceramic particles. The increased thickness of the border is believed to act as a restraint on the rate of shrinkage and produce a small degree of tension in the sheet. The border itself shrinks. The border may be of the same greenware as the sheet, or a different composition. The border greenware must be of a composition which will fuse to the ceramic particles of the sheet in the curing temperature range.

The width W and depth D of the border 11 are not particularly critical. These dimensions must only be sufficient to apply a desired restraint without too great a restraint which might tend to tear the sheet as it shrinks. A further consideration is economy in time and materials in applying the borders.

By way of example only, finished sheets of 0.016 inch thickness have been produced from 0.019 inch greenware with finished dimensions of 2-7/16 inches × 4-3/16 inches with borders of the same greenware. The green dimensions were 3¼ inches × 5¼ inches. In the following examples, the corners of the borders were notched as shown at 15 in FIG. 4. This was done to facilitate later cutting of the borders from the sheet. The samples were as follows:

A. $D = 0.019$ inch    $W = 0.25$ inch
B. $D = 0.076$ inch    $W = 0.25$ inch (4 layers of 0.019 inch C. $D = 0.019$ inch    $W = 0.125$ inch
D. $D = 0.019$ inch    $W = .0625$ inch The foregoing were fired together with a control sheet of the same dimension having no border. The control piece upon curing to a finished thickness of 0.016 inch, exhibited surface flaws, together with surface depressions and rises. It would have been unacceptable for use as a substrate for an electronic circuit, even if ground and lapped.

Sample (C) had such little camber and distortion that it would be acceptable for commercial use. Sample (D) was superior to the control sheet, but would require some grinding before it was acceptable for commercial use. Sample (A) exhibited only slight surface distortion and would be acceptable for commercial use. Sample (B) with the border of greater depth exhibited less camber than (A) and had almost no surface distortion.

A larger sheet which was trimmable to finished dimensions of 6⅝ inches × 4½ inches was fired, with a border of fifteen layers of 0.019 greenware, 0.25 inch wide. The finished area of the sheet exhibited no camber to the eye and was essentially free of surface defects.

The dimensions of the total border need only be sufficient to apply the necessary restraining force during shrinkage of the sheet while permitting normal shrinkage, and must not be so great that the border would inhibit shrinkage to the extent the sheet would tear. This would only occur on sheets of about 0.002 inch with perhaps 0.20 inch border. There is a wide range of border depth D which may be utilized depending on the thickness of the sheet and the lineal dimensions thereof. The contact of the borders and the sheet must be sufficiently intimate that the ceramic particles of the border and sheet fuse along the contacting surfaces. Where the border is built up of several layers the contact between the border defining layers must be sufficient to produce fusion when the assembly is fired.

Figure 4:
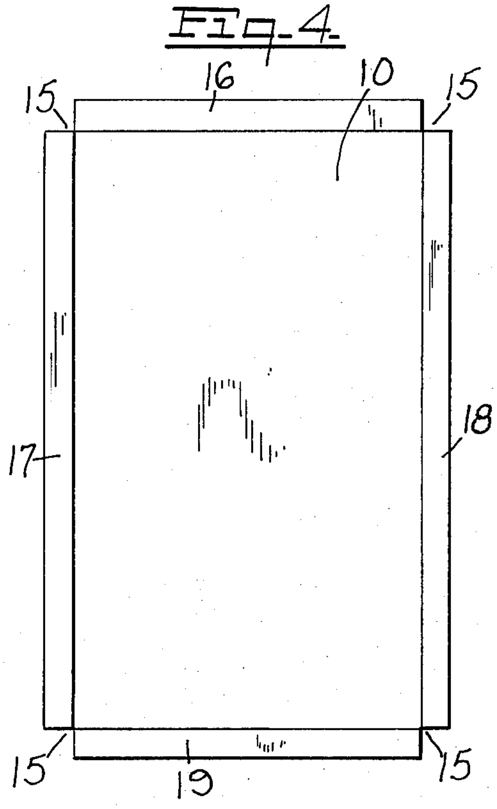
FIG. 4 is a plan view of a sheet of green ceramic ready for curing in accordance with the invention.
Figure 5:
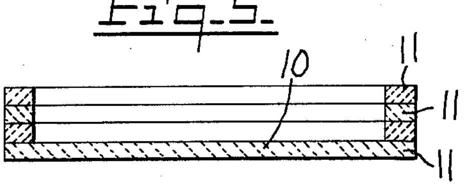
FIG. 5 is an elevation in half section of still another sheet of green ceramic ready for curing.

The selection of the dimensions of the border will depend on various considerations. For many substrates a border of the same thickness will suffice. A border having a thickness several times the thickness of the sheet as shown in FIG. 5 will provide a smoother sheet of less camber. The increased thickness border lowers the rate of shrinkage, but requires more material and time of assembly in the green state. Where the corners are notched as shown in FIG. 4, the border elements may be applied in the form of separate strips 16–19. There is no apparent difference in the finished product whether the border is complete or notched as shown in FIG. 4.

Ten substrate sheets of various lineal dimensions were made in accordance with the invention, and submitted to a testing laboratory for analysis. The 10 sheets were of sizes set forth below. Some had full borders and some had partial as shown in FIG. 4. All were 0.019 inch thick green and 0.016 cured. All finished parts were passed between parallel plates which indicated a camber of less than 0.002 inch/inch. Part number 5 tested to a camber of 0.001 inch/inch.

| PART | SIZE | BORDER |
|---|---|---|
| 1 | 1 15/16" × 2" | Full |
| 2 | 1 15/16" × 1⅞" | Full |
| 3 | 1⅝" × 3" | Full |
| 4 | 1¼" × 3¾" | Full |
| 5 | 2⅝" × 4⅛" | Full |
| 6 | 1" × 1⅝" | Partial |
| 7 | ⅞" × 1¾" | Full |
| 8 | 1⅜" × 1⅜" | Partial |
| 9 | 2¼" × 3½" | Partial |
| 10 | 2" × 2" | Full |

The borders were the same thickness as the sheet and 0.25 inch in width. The finished sheets had average arithmetical surface finishes of 12 to 23 microinches as measured by a Clevite, 360 System Surfanalyzer.

Sheets of 0.0005 inch finished thickness having finished dimensions of 4½ inches × 1¼ inches have been made using borders of 0.002 inch. Such sheets were made of lead barium niobate (PBN) for dielectrics in capacitor applications. Such sheets had no discernible surface defects and negligible camber.

The composition of the PBN sheets was 40–70% ceramic, 20–50% binder (methyl methacrylate), 1–4% plasticizer (Monsanto Chemical Company No. 160 Santicizer) and 10–20% ethylene dichloride solvent. After blending and casting into tape or strip form and initial air drying, the strip is dried at temperatures of 200°–400°F. to completely drive out moisture and solvents.

Figure 6:
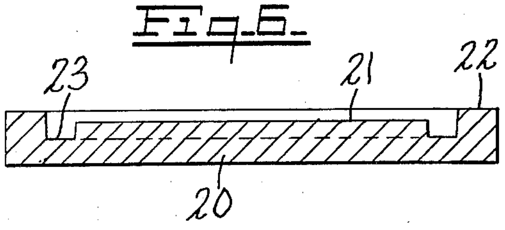
FIG. 6 is an elevation in half section of a form for preparing a sheet of green ceramic for curing in accordance with the invention.

The invention may also be practiced by casting a sheet of the desired size and thickness (considering shrinkage) in a form. FIG. 6 exemplifies a form as mold 20 having a surface 21 recessed from an outer surface 22, to define the green thickness of a sheet. A border-like recess 23 is also defined in form 20. The ceramic slurry is poured into form 20, allowed to initially dry to a greenware sheet, then placed on a piece of kiln furniture as shown in FIG. 2 and subjected to the necessary curing temperatures, with an integral border.

The border may be discontinuous in several pieces along a lineal dimension of the sheet. The borders are applied to increase the thickness of the sheet and generally to define the shape of the finished sheet, and the size thereof considering shrinkage. The borders act as edge restraints to control the rate of shrinkage of the sheet. The restraint is deemed to be equivalent to creating some degree of tension in the sheet as the ceramic particles commence fusing together toward the center and "shrinking" the overall dimensions of the sheet. The borders are believed to tend to orient or control the movement of the particles and molecules as fusion takes place, and act to prevent random motion of the molecules as they accept heat energy. However, this is theory and not limiting on the actual scope of the invention.

The invention may be practiced by restraining the edges of the sheet to control the rate of shrinkage in other manners.

A border of metallic compositions in a liquid vehicle may be deposited on a greenware sheet, as by a screening technique, to define the desired size and shape of the finished sheet. A suitable composition is one of 40–60% platinum, 30–50% palladium and 5–15% gold in a liquid vehicle. A suitable substance for this process is Quick film Conductor Ink (No. MB1-169 of Maltby Bishop, Inc. of Melvern, Pa. This mixture is screened onto the sheet. As the sheet is fired, the vehicle burns out and leaves a metallic border in the range of 500°–800°F. This metallic border then creates what may be termed an unbalanced condition as the ceramic particles start to fuse. As the temperature is raised, the edges of the sheet curl towards a spiral configuration with the metal on the inside of the spiral. This is believed to be due to the fact that as the vehicle for the metal is driven off, the metal particles shrink on the surface of the greenware sheet and produce the curling action. This curl of the edge creates a restraining force on the edges of the sheet upon curing without preventing normal shrinkage. Any metallic composition may be used which will bond to the greenware.

It may thus be seen that the objects set forth above as well as those made apparent from the preceding description are efficiently attained. While a preferred embodiment of the invention has been set forth for purposes of disclosure, it is to be understood that other embodiments to the invention as well as modifications to the disclosed embodiment which do not depart from the spirit and scope of the invention may become apparent to those skilled in the art. Accordingly, the appended claims are intended to cover all embodiments and modifications of the invention which do not depart from the spirit and scope of the invention.

What is claimed is:

1. The method of making a sheet of cured ceramic with minimal distortion which comprises the steps of providing a sheet of ceramic greenware of the desired size, defining a substantial border of increased thickness of ceramic greenware in a pattern on said sheet about the area of the desired finished size and shape of said sheet considering shrinkage, said border being in intimate contact with said sheet such that upon curing said border will fuse to said sheet, and subjecting said sheet-border assembly to a temperature and for a time to effect curing of said border and said sheet, said border being selected to be of sufficient weight to restrain the rate of shrinkage of said sheet upon heating, but insufficient to prevent normal shrinkage of said sheet upon curing thereof.

2. The method of claim 1 wherein said border is made integral with said sheet.

3. The method of claim 1 wherein said border is made of strips of greenware of the same thickness as said sheet.

4. The method of claim 1 where said sheet is rectangular, said border is continuous and defined by two rectangles upon application to said sheet, and the corners of said border and said sheet are cut off before subjecting said border-sheet assembly to curing.

5. The method of claim 1 where intimate contact is established between said border and said sheet by pressure consolidation.

6. The method of claim 1 where intimate contact is established between said border and said sheet by applying a solvent between said sheet and the contacting surfaces of said border.

7. The method of claim 1 wherein intimate contact is established between said border and said sheet by screening the increased thickness onto said sheet in a greenware slurry.

8. The method of making a cured sheet of ceramic with minimal distortion which comprises the steps of providing a sheet of ceramic greenware containing ceramic particles, said sheet being of selected size so that upon curing and shrinkage a sheet of predetermined dimension and shape is provided, heating said sheet to produce fusion of the ceramic particles while applying forces to said sheet only outside of said predetermined dimensions, considering shrinkage, to restrain the rate of shrinkage and minimize distortion of the sheet but insufficient to prevent normal shrinkage of said sheet upon curing thereof.

9. The method of claim 8 wherein said forces are applied by increasing the thickness of the greenware outside of said predetermined dimensions.

10. The method of claim 8 wherein said restraint is applied by defining a substantial border of metallic composition to a surface of the greenware outside of said predetermined dimensions, said composition being of a character which will bond to the greenware as the greenware is fired.

11. A method of making sheets of ceramic with minimal distortion, comprising the steps of providing a sheet of the desired thickness of greenware of ceramic particles, heating said sheet of greenware for a time and at a temperature sufficient to produce fusion of said ceramic particles and resultant shrinkage of the sheet while simultaneously applying restraint to the edges of the sheet only outside of the final bounds of the sheet to control the rate of shrinkage, said forces being sufficient to restrain the rate of shrinkage of said sheet while permitting normal shrinkage thereof.

12. The method of claim 11 wherein the step of restraining includes the step of providing at least one border of greenware in a pattern to said sheet to define the finished shape of said sheet in intimate contact therewith so that said border will fuse to said sheet.

13. The method of claim 12 wherein borders are deposited on both sides of said sheet.

14. The method of claim 11 wherein the step of restraining is accomplished by providing a border of greenware integral with said sheet.

15. The method of claim 11 wherein the step of applying restraint comprises the definition of a metallic border on said sheet outside of the final bounds of the sheet, which metallic border bonds to the greenware upon firing but before curing of the sheet.

* * * * *